(12) United States Patent
Waissi et al.

(10) Patent No.: US 10,072,581 B2
(45) Date of Patent: Sep. 11, 2018

(54) GAS TURBINE ENGINE COMPRISING A STARTER ENGAGED WITH A LOW-PRESSURE BODY

(71) Applicant: SAFRAN AIRCRAFT ENGINES, Paris (FR)

(72) Inventors: Bellal Waissi, Moissy-Cramayel (FR); Sébastien Chalaud, Moissy-Cramayel (FR); Alain Pierre Garassino, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/309,109

(22) PCT Filed: May 7, 2015

(86) PCT No.: PCT/FR2015/051213
§ 371 (c)(1),
(2) Date: Nov. 4, 2016

(87) PCT Pub. No.: WO2015/170058
PCT Pub. Date: Nov. 12, 2015

(65) Prior Publication Data
US 2017/0074169 A1 Mar. 16, 2017

(30) Foreign Application Priority Data
May 7, 2014 (FR) ...................................... 14 54133

(51) Int. Cl.
*F02C 7/00* (2006.01)
*F02C 7/275* (2006.01)
(Continued)

(52) U.S. Cl.
CPC .............. *F02C 7/275* (2013.01); *F01D 19/00* (2013.01); *F02C 7/36* (2013.01); *F05D 2220/32* (2013.01); *F05D 2260/85* (2013.01)

(58) Field of Classification Search
CPC ............... F02C 1/007; F02C 3/30; F02C 3/34
(Continued)

(56) References Cited

U.S. PATENT DOCUMENTS

| 4,117,343 A | * | 9/1978 | Hoffeins | .................... F02C 6/16 |
| | | | | 290/52 |
| 8,015,828 B2 | * | 9/2011 | Moniz | ..................... F02C 7/275 |
| | | | | 60/778 |

(Continued)

FOREIGN PATENT DOCUMENTS

| EP | 2192291 A2 | 6/2010 |
| GB | 790550 A | 2/1958 |

OTHER PUBLICATIONS

Written Opinion of the International Searching Authority dated Aug. 10, 2015, issued in corresponding International Application No. PCT/FR2015/051213, filed May 7, 2015, 8 pages.
(Continued)

*Primary Examiner* — Julio C. Gonzalez
(74) *Attorney, Agent, or Firm* — Christensen O'Connor Johnson Kindness PLLC

(57) ABSTRACT

A multi-body gas turbine engine, especially an aircraft engine, comprising at least one low-pressure rotating body, a high-pressure rotating body, and a starter designed to rotate the high-pressure body in order to start the engine, wherein the starter is coupled to the low-pressure body and the engine comprises a first disengageable coupling device disposed between the low-pressure body and the high-pressure body, for rotatably connecting the high-pressure
(Continued)

body to the low-pressure body so as to allow the starting of the engine by means of the starter.

8 Claims, 1 Drawing Sheet

(51) Int. Cl.
*F01D 19/00* (2006.01)
*F02C 7/36* (2006.01)

(58) Field of Classification Search
USPC ....... 290/52; 60/39.17, 39.11, 39.15, 39.163, 60/778
See application file for complete search history.

(56) References Cited

U.S. PATENT DOCUMENTS

| | | | |
|---|---|---|---|
| 2007/0151258 A1* | 7/2007 | Gaines | F02C 7/36 60/792 |
| 2007/0277532 A1* | 12/2007 | Talan | F02C 3/113 60/792 |
| 2010/0005810 A1 | 1/2010 | Jarrell et al. | |
| 2010/0212326 A1* | 8/2010 | Vialle | F01D 15/02 60/778 |
| 2011/0101693 A1* | 5/2011 | Goi | F02C 7/275 290/46 |
| 2015/0330300 A1* | 11/2015 | Suciu | F02C 7/27 416/169 R |
| 2015/0377142 A1* | 12/2015 | Sheridan | F02C 3/107 60/778 |

OTHER PUBLICATIONS

International Preliminary Report on Patentability dated Nov. 8, 2016, issued in corresponding International Application No. PCT/FR2015/051213, filed May 7, 2015, 1 page.

International Search Report dated Aug. 10, 2015, issued in corresponding International Application No. PCT/FR2015/051213, filed May 7, 2015, 2 pages.

Written Opinion of the International Searching Authority dated Aug. 10, 2015, issued in corresponding International Application No. PCT/FR2015/051213, filed May 7, 2015, 6 pages.

* cited by examiner

GAS TURBINE ENGINE COMPRISING A STARTER ENGAGED WITH A LOW-PRESSURE BODY

FIELD OF THE DISCLOSURE

The field of the present disclosure is that of gas turbine engines, such as turbine engines, and in particular those intended for the propulsion of aircraft.

Embodiments of the disclosure relate more particularly to starting a multi-spool gas turbine engine.

BACKGROUND

A multi-spool gas turbine engine comprises at least two rotating bodies. Most of the turbines are twin-spool or triple-spool, but a higher number of spools is also possible. A body is formed by a rotor that rotates about an axis, and a shaft that connects a module forming the compressor and a module forming the turbine, the compressor module being driven by the turbine module, via the shaft.

Some of the energy generated by the engine is used to drive various items of equipment thereof. Conventionally, all of the power required is mechanically drawn from the shaft of the high-pressure body of the engine, by means of a power take-off shaft that is arranged substantially radially with respect to the shaft of the high-pressure body, and is connected to a gearbox for driving accessory equipment, generally known by the term "accessory gearbox", or AGB. The accessory gearbox is mounted in the nacelle of the engine and is connected to some equipment or accessories such as, in particular, one or more electrical generator(s), hydraulic fuel and oil pumps, and a starter motor.

There is currently a tendency to increase the supply of electrical power for the accessories, and it is therefore necessary to use generators which require increased mechanical power for their operation. Providing increased mechanical power while maintaining the operability of the turbine engine throughout its flight region requires a solution to be found other than that of drawing power from the shaft of the high-pressure body.

One solution could consist in drawing the power from the low-pressure body of the engine.

However, the engine cannot start without a preliminary phase of setting the high-pressure body into rotation. Only when the shaft of the high-pressure body reaches a sufficient rotational speed can the corresponding compressor provide enough air to the combustion chamber, for the purpose of starting the engine.

One solution therefore consists in coupling the starter motor to the low-pressure body of the engine, and allowing the low-pressure body to be coupled to the high-pressure body during the start-up phase.

Indeed, increasing the power requirements of the electrical generators also makes it possible to design electrical machines that can be used in a reversible manner in an electric motor. The power of a machine of this kind is sufficient for rotating the high-pressure body of the engine.

WO 2014/0134256 discloses a multi-spool gas turbine engine, in particular an aircraft engine, comprising at least one rotating low-pressure body, a rotating high-pressure body, and a starter motor, in which the starter motor is coupled to the low-pressure body, and in which the engine comprises a first disengageable coupling device which is interposed between the low-pressure body and the high-pressure body in order to rotatably connect the high-pressure body to the low-pressure body in order to make it possible to start up the engine by means of the starter motor.

In this document, the coupling or separation of the coupling device is determined by an inertia clutch device that is automatically separated at a pre-determined speed of the low-pressure body, the high-pressure body and the coupling device. The separation speed is thus determined by the high-pressure body, and therefore the low-pressure body may, nevertheless, be driven at speeds that are too high.

SUMMARY

One solution for overcoming this drawback consists in controlling the separation on the basis of the relative speeds of the two bodies.

For this purpose, the embodiments of the disclosure propose an engine of the type described above, wherein the first coupling device is designed so as to be movable between:

a first position, in which the coupling device is engaged so that the low-pressure body drives the high-pressure body, a second position, in which the coupling device is disengaged once a speed of the low-pressure body falls below that of the high-pressure body.

According to other features of the embodiments of the disclosure:

the first coupling device is of the freewheel type, the low-pressure body comprises a shaft that is mounted coaxially in or on a shaft of the high-pressure body, the first freewheel coupling device being mounted between the shafts of the low-pressure and high-pressure bodies, the first coupling device comprises a free wheel having jamming elements, in particular a free wheel comprising rollers, balls, rolls or jacks, the engine comprise a gearbox for driving accessory equipment of the engine, the gearbox is coupled to the low-pressure body by means of a shaft that is arranged substantially radially with respect to the low-pressure body, the starter motor is a pneumatic starter motor, and a second disengageable coupling device is mechanically interposed between the pneumatic starter motor and the shaft that radially connects the gearbox for driving the accessory equipment to the low-pressure body, the second disengageable coupling device is a second free wheel which is interposed, in particular, between the pneumatic starter motor and the gearbox for driving the accessory equipment, the starter motor is a reversible electrical machine that forms the starter and the generator.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

In the following description, like reference numerals denote parts which are the same or have similar functions.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
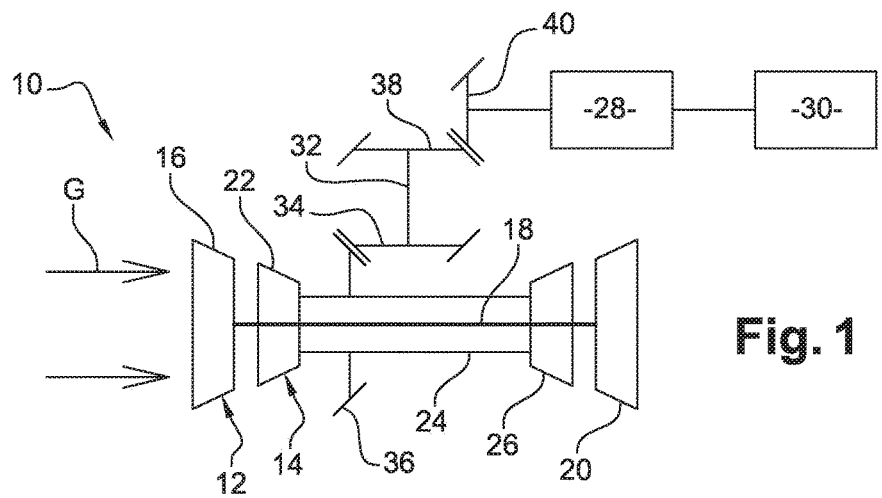
FIG. 1 is a schematic view of a gas turbine engine according to the prior art.

FIG. 1 shows a multi-spool gas turbine engine 10, in particular intended for equipping an aircraft.

In a known manner, as shown in FIG. 1, the engine 10 comprises at least one rotating low-pressure body 12 and a rotating high-pressure body 14. The low-pressure 12 and high-pressure 14 bodies are co-rotating.

The low-pressure (LP) body 12 substantially comprises, in the flow direction of the gases "G", a LP compressor rotor 16 that is connected to a LP turbine rotor 20 by means of a LP shaft 18.

The high-pressure (HP) body 14 substantially comprises, in the flow direction of the gases, a HP compressor rotor 22 that is connected to a HP turbine rotor 26 by means of a HP shaft 24. A combustion chamber (not shown) is mounted between the HP compressor and the HP turbine, and supplies combustion gases to the HP turbine, where the combustion gases expand in order to set the HP turbine rotor 26 into rotation, which rotor in turn drives the HP compressor rotor 22 via the HP shaft 24.

The LP 18 and HP 24 shafts are coaxial. The LP shaft 18 axially passes through the tubular HP shaft 24 and is thus surrounded by the HP shaft 24.

In this arrangement, the LP compressor supplies air to the HP compressor which in turn supplies air to the combustion chamber (not shown). The HP turbine supplies combustion gas to the LP turbine.

In a known manner, the engine 10 comprises a gearbox 28 for driving accessory equipment of the engine, or an accessory gearbox, which is mounted on the fan casing or on the HP compressor casing (not shown) of the engine and which carries at least one starter motor 30 that is capable of being rotationally coupled to the high-pressure body 14 in order to allow, in particular, the body 14 to be set into rotation in order to start up the engine.

The gearbox for driving the accessory equipment 28 also carries some equipment or accessories such as, in particular, an electrical generator, an alternator and hydraulic fuel and oil pumps (not shown).

The starter motor 30 must necessarily be coupled to the high-pressure body 14 in order to allow the engine to be started up. Indeed, only if this condition is fulfilled does the combustion chamber receive sufficient air from the HP compressor 22 to initiate the combustion. Supplying the combustion chamber by means of the one LP compressor 16 is not sufficient for allowing the engine to be started up.

The gearbox for driving accessory equipment 28 is coupled to the HP shaft 24 of the HP body 14 of the engine, either for providing driving power from the starter motor 30 or for drawing driving power from the shaft 24 in order to allow operation of the equipment or accessories of the gearbox 28.

In order to achieve this, a power take-off shaft 32 is arranged substantially radially with respect to the HP shaft 24. The shaft 32 comprises a pinion 34 at one end which is coupled to an output pinion 36 of the HP shaft 24, and a pinion 38 at the opposite end which is connected to an input pinion 40 of the gearbox for driving accessory equipment 28.

However, the current tendency is to increase the supply of electrical power for the accessories of the gearbox 28, and it is therefore necessary to use generators that require increased mechanical power for their operation. Providing increased mechanical power while maintaining the operability of the engine throughout its flight region requires a solution to be found other than that of drawing power from the shaft 18 of the high-pressure body 14.

Indeed, it is not possible to draw power from the HP body 14 during a phase of nominal engine operation, since this would risk disrupting the operation of the turbine engine due to pumping.

One solution consists in drawing the necessary mechanical power from the low-pressure body 12.

There is then the problem of driving the high-pressure body 14 while the engine is being started up.

Figure 2:
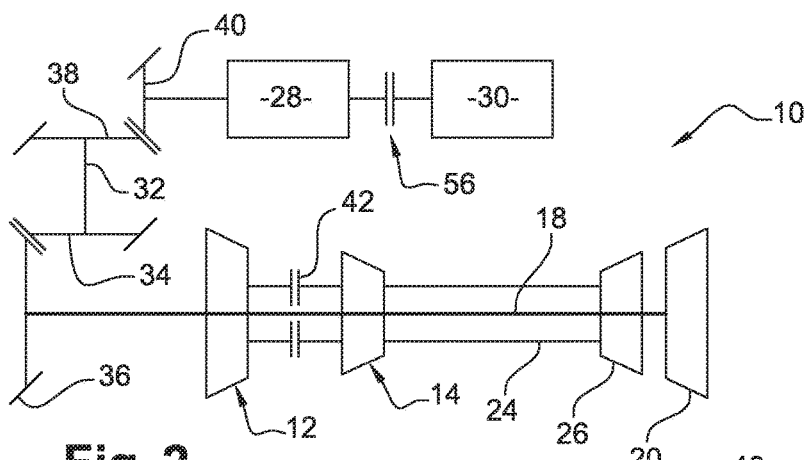
FIG. 2 is a schematic view of a gas turbine engine according to the disclosure.

As shown in FIG. 2, the embodiments of the disclosure overcome these drawbacks by proposing an engine 10 of the type described above, comprising a starter motor 30 that is engaged with the shaft 18 of the low-pressure body 12 of the engine 10, and comprising a device for coupling the low-pressure body 12 to the high-pressure body 14 during the start-up phase.

According to a design that is already known, as shown in FIG. 2, the embodiments of the disclosure propose an engine 10 of the type described above, wherein the gearbox 28 is coupled to the low-pressure body 12, and in that the engine 10 comprises a first disengageable coupling device 42 which is interposed between the low-pressure (LP) body 12 and the high-pressure body 14 in order to rotatably connect the high-pressure body 14 to the low-pressure body 12 in order to make it possible to start up the engine 10 by means of the starter motor 30.

In a manner similar to the design above, a power take-off shaft 32 is arranged substantially radially with respect to the LP shaft 18 of the low-pressure body 12. The shaft 32 comprises a pinion 34 at one end which is coupled to an output pinion 36 of the LP shaft 18, and a pinion 38 at the opposite end which is connected to an input pinion 40 of the gearbox for driving accessory equipment 28.

According to the embodiments of the disclosure, the first coupling device 42 is designed to be controlled on the basis of the relative speed of the low-pressure and high-pressure bodies 12 and 14.

The first coupling device 42 is thus movable between:

a first position, in which the coupling device 42 is engaged so that the low-pressure body 12 drives the high-pressure body 14, a second position, in which the coupling device 42 is disengaged once a speed of the low-pressure body 12 falls below that of the high-pressure body 14.

The engine 10 can thus comprise a controlled coupling device 42 and a control means associated with the coupling device 42 that would be capable of assuming the first position, in which the means would control the engagement of the coupling device 42.

Depending on the shape of this controlled coupling device 42, the device can be engaged as soon as the low-pressure body 12 is started up or, in contrast, can be gradually engaged after the low-pressure body 12 has been started up.

In any case, in the first position, the starter motor 30 can drive the low-pressure body 12, which in turn drives the high-pressure body 14 via the first coupling device 42. This first position thus allows the engine 10 to be started up.

Then, in a second position that is associated with a speed of the low-pressure body 12 that has fallen below that of the high-pressure body 14 after start-up, the control means can disengage the coupling device 42. In this second position, after the engine 10 has been started-up, the high-pressure body 14 reaches a rotational speed that is sufficient not only for it to no longer be necessary to drive the body, but moreover for it to be necessary to separate the high-pressure body 14 from the low-pressure body 12. Indeed, it is necessary to prevent the high-pressure body 14 from driving the low-pressure body 12 at too high a speed in order to prevent damage to the turbine engine and to the drive chain for the equipment of the regulation system (including the equipment).

The first disengageable coupling device 42 could be formed by a mechanical, hydraulic or electromagnetic clutch, and the control means associated with this first device (not shown) could be formed according to any embodiment known from the prior art that is suitable for controlling the coupling device in accordance with the two positions mentioned above. In particular, the control means could comprise a mechanical, hydraulic or electromagnetic actuator that is controlled by associated electronics.

However, in the preferred embodiment of the disclosure, the first coupling device simply comprises a free wheel 42 that is interposed between the low-pressure body 12 and the high-pressure body 14 and, more precisely, between the LP 18 and HP 24 shafts.

In this design, the free wheel 42 is thus movable between a first position which is, by default, associated with the start-up of the engine 10 and in which the wheel is engaged, and a second position which is associated with a speed of the low-pressure body 12 that has fallen below that of the high-pressure body 14 and in which the wheel is disengaged.

Therefore, the free wheel 42, alone, ensures the above-mentioned functions of disengageable coupling and of control.

In the rest of the present description, reference sign 42 will refer to the freewheel device that forms the first disengageable coupling device 42.

The first freewheel device 42 is preferably a freewheel device comprising jamming elements, in particular a free wheel comprising rollers, balls, rolls or jacks.

Figure 3:
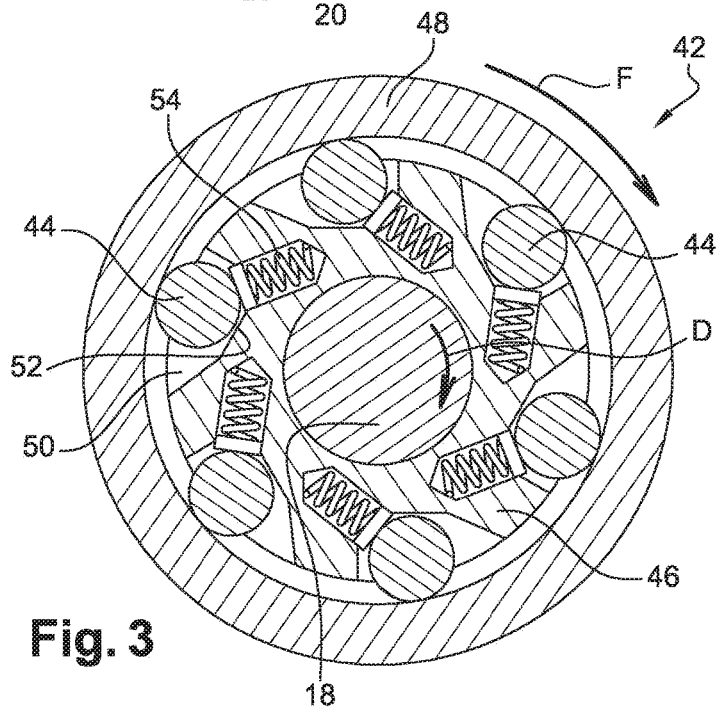
FIG. 3 is a cross section of an embodiment of a freewheel coupling device for a gas turbine engine according to the disclosure.

By way of example, FIG. 3 shows a freewheel device 42 comprising rolls 44. A device of this kind comprises an inner hub 46 that is rigidly connected to the LP shaft 18 and that is received in an outer ring 48 that is rigidly connected to the HP shaft 16. The hub 46 comprises cavities 50 that are provided with ramps 52 along which rolls 44 are movable, which rolls are resiliently returned towards the outer ring 48 by means of springs 54.

Depending on the relative direction of rotation of the inner hub 46 and of the ring 48, the rolls 44 are locked between the ramps 52 and the outer ring 48, thus locking the freewheel device 42.

In FIG. 3, the freewheel device is locked as soon as the inner hub 46, which is rigidly connected to the LP shaft 18, rotates in the start-up direction "D". The rotation of the LP shaft 18 sets the inner hub 46 into rotation, which causes the rolls 44 to jam between the ramps 52 and the outer ring 48 by means of the cone effect. The outer ring 48, and therefore the HP shaft, are thus set into rotation in the direction "F" by means of the LP shaft 18. After the engine has been started up, the speed of rotation of the HP shaft, and therefore of the ring 48, is greater than that of the LP shaft 18. The rolls 44 are then moved away from the ramps 52 and roll between the ring 48 and the hub 46, the hub thus not being driven by the ring 48. The ring 48 and the HP shaft are thus unlocked and rotate in the operating direction "F" of the engine 10 without driving the LP shaft 18.

According to a first embodiment of the disclosure that is shown in FIG. 2, the starter motor 30 is a conventional pneumatic starter motor, and a second engageable coupling device 56, in particular a second free wheel, is mechanically interposed between the pneumatic starter motor 30 and the shaft 32 in order for the starter motor 30 not to be driven once the engine 10 has been started up. In particular, this engageable coupling device 56 is interposed between the pneumatic starter motor 30 and the gearbox 28, as shown in FIG. 2.

In a variant (not shown), the starter motor 28 can be a reversible electrical machine that forms the starter and the generator. Indeed, increasing the power requirements of the electrical generators also makes it possible to design electrical machines that can be used in a reversible manner in an electric motor. The power of a machine of this kind is sufficient to form a starter motor that makes it possible to set the low- and high-pressure bodies 12, 14 of the engine 10 into rotation.

It will be noted that two configurations are possible according to this variant (not shown).

According to a first configuration, in a manner similar to the embodiment described above with reference to FIG. 2, which shows an engine 10 comprising a pneumatic starter motor, a controlled disengageable coupling device can be interposed between the electrical machine and the gearbox 28.

This disengageable coupling device can, in some configurations, make it possible to disengage the electrical machine operating as a generator, for example when the engine 10 has already been started up and if sufficient energy has also been stored in accumulators. This configuration makes it possible to prevent the electrical machine from being driven, which would lead to power being drawn off unnecessarily.

According to a second configuration, no coupling device is interposed between the electrical machine and the gearbox 28. In this case, the electrical machine operates as a starter motor while the engine is being started up, and then as a generator once the first body provides driving power to the electrical machine via the gearbox 28. In this case, the engine 10 takes full advantage of the reversibility of the electrical machine.

The embodiments of the disclosure therefore propose an engine comprising a gearbox 28 that is engaged with the first low-pressure body 12 and is compatible with the increased requirements with respect to power consumption.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A multi-spool gas turbine engine comprising:
   at least one rotating low-pressure body;
   a rotating high-pressure body;
   a starter motor being coupled to the low-pressure body;
   a first disengageable coupling device interposed between the low-pressure body and the high-pressure body in order to rotatably connect the high-pressure body to the low-pressure body in order allow start up of the engine by the starter motor, wherein the first disengageable coupling device is designed so as to be movable between:
      a first position, in which the first disengageable coupling device is engaged so that the low-pressure body drives the high-pressure body, and
      a second position, in which the first disengageable coupling device is disengaged once a speed of the low-pressure body falls below that of the high-pressure body; and
   a gearbox for driving accessory equipment of the engine, the gearbox being coupled to the low-pressure body by a shaft that is arranged substantially radially with respect to the low-pressure body, wherein a second disengageable coupling device is mechanically interposed between the starter motor and said shaft.

2. The turbine engine according to claim 1, wherein the first disengageable coupling device is a freewheel.

3. The turbine engine according to claim 2, wherein the low-pressure body comprises a shaft that is mounted coaxially in or on a shaft of the high-pressure body, the first freewheel being mounted between the shafts of the low-pressure and high-pressure bodies.

4. The turbine engine according to claim 2, wherein the first disengageable coupling device comprises a free wheel having jamming elements.

5. The turbine engine according to claim 4, wherein the jamming elements of the free wheel are selected from the group consisting of rollers, balls, rolls and jacks.

6. The turbine engine according to claim 1, wherein the starter motor is a pneumatic starter motor.

7. The turbine engine according to claim 6, wherein the second disengageable coupling device is a second free wheel which is interposed between said pneumatic starter motor and the gearbox.

8. The turbine engine according to claim 1, wherein the starter motor is a reversible electrical machine that forms the starter and a generator.

* * * * *